June 30, 1959 J. O. PAIVINEN 2,892,936

DELAY CIRCUIT

Filed Nov. 4, 1955

INVENTOR.
JOHN O. PAIVINEN

BY Ralph K. Bone Jr.

AGENT

United States Patent Office 2,892,936

Patented June 30, 1959

2,892,936

DELAY CIRCUIT

John O. Paivinen, Berwyn, Pa., assignor to Burroughs Corporation, Detroit, Mich., a corporation of Michigan Application November 4, 1955, Serial No. 544,921

1 Claim. (Cl. 250—27)

This invention relates to circuit arrangements such as may be employed in digital computers, for example, to derive a signal from the output of a bistable circuit which is delayed relative to the signal initiating a change of state of the circuit.

In computers, particularly where circuit arrangements involving a bistable device or flip-flop are employed, it is frequently necessary to obtain an output signal which has its start delayed until an input signal, such as the signal triggering the flip-flop, has ceased to exist. In earlier devised circuits, for example as disclosed in the co-pending application of R. J. Williams, Serial No. 486,004, filed February 3, 1955, now Patent No. 2,842,662 a delay of this nature has been provided by a lumped constant delay line. In most applications a line comprising a number of sections is called for to provide a delay of suitable magnitude and when many such lines are used the space occupied, in addition to the cost, is a factor adversely affecting the computer design. The present invention achieves the same result in an improved and simpler manner through the use of a novel gating arrangement and of special purpose periodic timing impulses operating in conjunction therewith. This results in a substantial saving in space and cost as compared to the use of multisection delay lines.

It is an object of the invention to provide means for deriving a signal in selected time relationship to another signal.

Another object is to provide relatively low cost, low volume means for deriving a delayed output signal from a bistable circuit.

Another object is to provide improved means for obtaining a signal selectively spaced in time relative to a trigger pulse actuating a bistable circuit.

Another object is to provide improved means for deriving from the output of a bistable circuit, in response to a change of state of the circuit initiated by a trigger pulse, a signal whose start is delayed until said trigger pulse has ceased to exist.

Other objects and advantages of the invention will be apparent upon consideration of the following specification and of the appended drawings in which.

Figure 1:
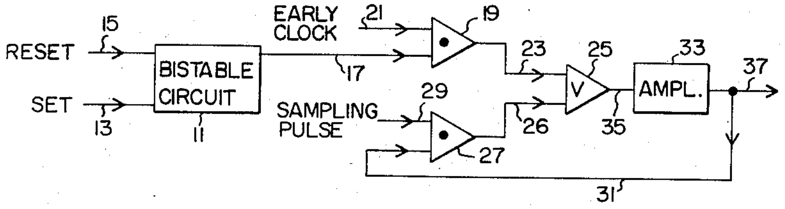
Fig. 1 is a schematic circuit drawing in block diagram form illustrating the principles of the invention.

In Fig. 1 there is shown a simplified embodiment of the invention in block diagram form comprising a bistable circuit or flip-flip 11 having "Set" and "Reset" input leads

13 and 15, respectively, and an output lead 17 the potential of which alternates between two values, one of which is zero or ground potential, in correspondence with the existence of the two operating states of circuit 11. Lead 17 serves to apply the variable potential thereof as one input to coincidence circuit or gate 19, a second input being applied by way of lead 21. This second input is a sequence of uniformly spaced "Early Clock" signals, further to be referred to, the term "Early Clock" being used to distinguish these special purpose signals from the regular "Clock" signals of the computer having the same or an integrally related periodicity. It is to be understood that the "Set" and "Reset" signals applied to input leads 13 and 15, respectively, are applied selectively but, if applied, are applied at "Clock" time under the control of such regular "Clock" signals. In the claims, the term "clock time" signifies the time at which a "Set" or "Reset" input pulse may occur, if at all, and the term "clock period" means the interval between input pulses occurring at successive "clock times."

Output lead 23 of gate 19 receives a signal responsive to a coincidence of signals on input leads 17 and 21 and serves to apply one of the two possible inputs to mixer circuit 25. The other input to circuit 25 is the output of a second gate 27, which appears on lead 26. Circuit 25, by virtue of its known organization and operation, furnishes an output when an input is applied by way of either of leads 23 or 26. A signal on lead 26 occurs as a result of the coincidence of two inputs to gate 27, one being a periodically appearing "Sampling" pulse, applied by way of lead 29, and the other a signal on lead 31 derived from the output of amplifier 33. An output from circuit 25 is applied by way of lead 35 to the input of amplifier 33 whose output, the desired delay signal, appears on lead 37. As noted, a portion of the amplifier output is fed back as an input to gate 27.

Figure 2:
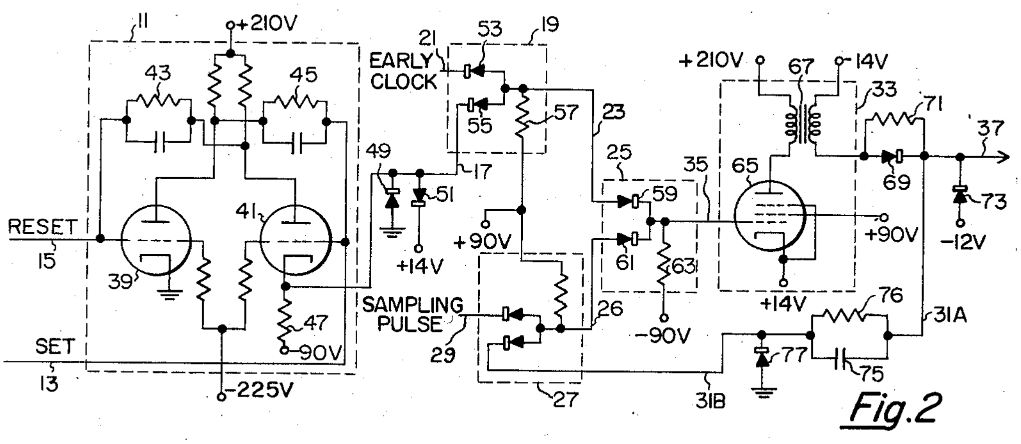
Fig. 2 is a more detailed diagram of the circuit of Fig. 1.

The several elements of the circuit of Fig. 1, above referred to, are shown in more detailed form in the circuit of Fig. 2. Thus, bistable circuit 11 is shown, by way of example, as comprising triodes 39 and 41 having the respective plates and grids thereof cross-coupled by RC networks 43 and 45. "Set" and "Reset" input signals are applied by way of leads 13 and 15, respectively, connected to the grids of the two tubes. Any suitable input networks (not shown) may be connected in these leads for signal shaping, clamping, or other purposes.

The output from circuit 11 is taken in cathode-follower manner across resistor 47 in the cathode circuit of triode 41 and, as it appears on lead 17, is held by diodes 49 and 51 to the limiting values of ground or zero potential and +14 volts. Gates 19 and 27, shown in detail in Fig. 2, are alike in construction, the former for example, comprising diodes 53 and 55 together with resistor 57 to which a positive potential of 90 volts is applied. Mixer circuit 25 comprises diodes 59 and 61, poled as shown, together with resistor 63 to which a negative potential of 90 volts is applied.

Amplifier 33 is shown, by way of illustration, as including pentode 65, normally biased beyond cut-off, to the control grid of which input lead 35 connects and in the plate circuit of which the primary winding of output transformer 67 is connected. The secondary winding, preferably designed to give a voltage step-up, has one terminal connected to a negative 14 volt source and the other to diode rectifier 69, poled as shown and shunted by resistor 71. A positive-going output from diode 69 appears on lead 37 and is clamped, negatively, at −12 volts by the connection including diode 73. Its upper limit is approximately +2 volts. The portion of the output of amplifier 33 that is fed back as an input to gate 27, passes by way of lead 31A to a parallel circuit comprising condenser 75 and resistor 76. This circuit serves as a D.C. shifting circuit between amplifier 33, having an output varying between −12 volts and +2 volts, and the input to gate 27 so that the potential variation of input lead 31B may be comparable to that of lead 17 and of the two timing pulses, the "Early Clock" and "Sampling" pulses, which vary between zero and +14 volts. The desired shift of the mean D.C. potential is brought about by the choice of the values of condenser 75 and resistor 76, in conjunction with the action of grounded diode 77 which has a negligible resistance to recharging current supplied to condenser 75. The time constant of this RC circuit is long enough so that substantially no discharge of the condenser occurs during the period of an output pulse from amplifier 33.

Figure 3:
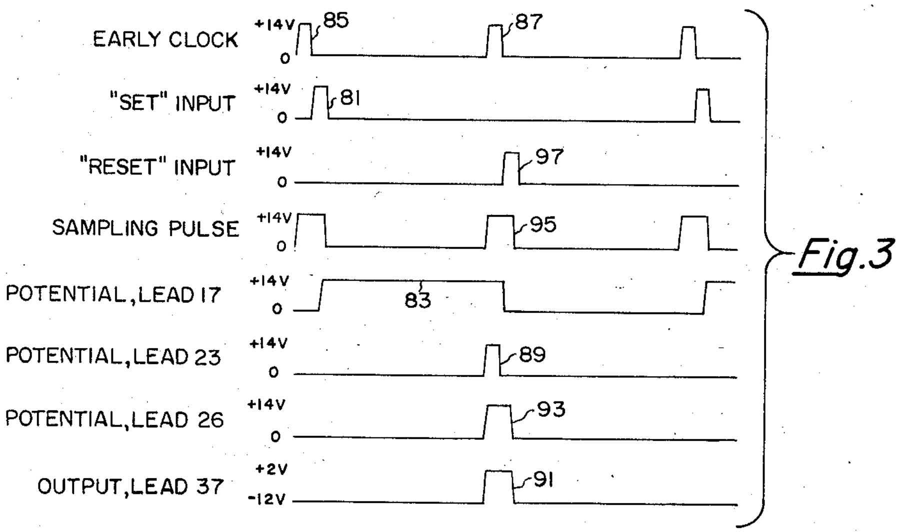
Fig. 3 is a series of waveform diagrams, illustrating the operation of the invention.

In operation, assuming an initial instant of time when bistable circuit 11 is in its "Reset" or zero condition with triode 39 conducting and triode 41 cut off, a positive-going "Set" pulse, as pulse 81 (Fig. 3), applied to the grid of the latter tube reverses the state of circuit 11 causing triode 41 to conduct. As a result, the potential of lead 17 rises from zero to +14 volts to form the leading edge of pulse 83 and continues at the higher value while circuit 11 is in its "Set" condition. "Early Clock" pulse 85, the first of the illustrated sequence of these regularly recurrent pulses, has terminated before the above-described action occurs so that no output from gate 19 appears on lead 23 until the occurrence of the second "Early Clock" pulse 87. This last pulse produces the necessary second input to gate 19 to cause output pulse 89 to appear on lead 23. Thus, pulse 89 is the result of a previously existing state of circuit 11, made effective by pulse 87.

Since mixer circuit 25 requires only one input to produce a rise in the potential of lead 35 sufficient to initiate conduction in pentode 65 and thereby furnish an output from amplifier 33, the occurrence of the leading edge of output pulse 91 on lead 37 is determined by and coincides with the occurrence of the leading edge of pulse 89 on lead 23, this in turn coinciding with the occurrence of the leading edge of "Early Clock" pulse 87. After pulse 89 ceases, pulse 93 on lead 26 continues to hold pentode 65 in a conducting condition through the operation of mixer circuit 25. Pulse 93 is the result of a coincidence of a "Sampling" pulse 95, one of a sequence of timing or reference signals having the periodicity of the "Early Clock" pulses, applied by lead 29 and a feed-back potential applied by way of lead 31, the period of the "Sampling" pulse overlapping that of "Early Clock" pulse 87. The feed-back connection from the output of amplifier 33 is a form of a so-called "lock over" circuit.

The occurrence of the trailing edge of pulse 91 coincides with the occurrence of the trailing edge of pulse 93 which in turn coincides with the trailing edge of "Sampling" pulse 95. Pulse 83 on lead 17 is terminated before the termination of pulse 95 by the reversal of state of bistable circuit 11 occasioned by the application of "Reset" pulse 97 to lead 15, this last pulse appearing after "Early Clock" pulse 87, so that no output from the delay circuit as a whole is possible due to the resulting change of circuit 11 back to its "Reset" condition.

From the above description of the operation of the circuit it will be seen that "Set" pulse 81 does not, during its existence, produce any output from the circuit as a whole. Its role is to produce a continuing output from bistable circuit 11 which conditions gate 19 so that at a later time, after pulse 81 has ceased to exist, an output from the complete delay circuit, pulse 91 on lead 37, can be initiated by one timing pulse, "Early Clock" pulse 87, this output being terminated at the termination of another timing pulse, "Sampling" pulse 95. In essence, therefore, a time delay is achieved measured by the interval between the time at which a change of state of a flip-flop occurs and the time at which the resulting output signal is made effective by timing means external to the flip-flop.

The period or duration of output pulse 91 is the interval between the occurrences of the leading edge of pulse 87 and the trailing edge of pulse 95. In this connection it will be noted that in the illustrated circuit this period corresponds more nearly to that of the second input applied to the circuit, "Reset" pulse 97, than to that of the initial "Set" pulse 81 which started the chain of events leading to its appearance. It will further be noted that not only does the circuit of the invention provide a delayed signal responsive to an input pulse triggering a bistable circuit, but it also serves reliably to prevent the generation of any output signal during the time said input pulse is present.

While the sequence of events controlling the generation of a single output pulse, only, has been described herein, the generation, in similar manner, of succeeding pulses will be clear. Also, while for purposes of explanation the signal pulses described in connection with the operation of the circuit of the invention have been characterized as positive-going, it will be evident that certain, or all, of these pulses may, instead, be negative-going and may have limiting values other than those shown in the drawing as an aid in explaining the operation of the illustrated circuit.

A preferred embodiment of the invention has been described in the foregoing specification and illustrated in the appended drawings. It is to be understood that this is by way of illustration and not by way of limitation of the scope of the invention. The limits of the invention are defined solely in the appended claim.

What is claimed is:

In a synchronous binary system employing input pulses occurring selectively at clock time, a circuit for identifying an input pulse signal as having one or the other binary value and for delaying said identified pulse signal one full clock period, said circuit comprising, in combination, a flip-flop circuit adapted to assume one or the other stable state in response to a first input pulse signal applied thereto at a first clock time, said flip-flop circuit when in one state delivering a direct-current output signal at one voltage level and when in the other state delivering a direct-current output signal at a different voltage level; first and second And gates; means for connecting the output of said flip-flop circuit to said first And gate; means for applying a pre-clock-time pulse to said first And gate subsequent to said first clock time but prior to the succeeding clock time, for passing a signal through said first And gate only when said flip-flop circuit is in its said one state at the time of application of said pre-clock-time pulse; means for applying, concurrently with the application of said pre-clock-time pulse to said first And gate, a sampling pulse to said second And gate, said sampling pulse continuing through and until the termination of said succeeding clock time; an Or gate; means for applying the output of said first And gate, if any, to said Or gate, thereby to pass a signal through said Or gate only when said flip-flop circuit is in its said one state at the time said pre-clock-time pulse is applied to said first And gate; an output circuit; means for applying the voltage output of said Or gate, if any, in parallel to said output circuit and to said second And gate; means for applying the output of said second And gate, if any, to said Or gate, for delivering to said output circuit and also to said second And gate, in the event of such signal from said second And gate, a signal voltage which continues during said succeeding clock time; and means for applying to said flip-flop circuit during said succeeding clock time a second input pulse for changing the state of said flip-flop circuit without disturbing the signal voltage applied to said output circuit during said succeeding clock time, said output circuit signal during said succeeding clock time being controlled by and in accordance with the state assumed by said flip-flop circuit in response to said first input pulse signal applied during said first clock time.

References Cited in the file of this patent

UNITED STATES PATENTS

| | | |
|---|---|---|
| 2,521,146 | Blayney | Sept. 5, 1950 |
| 2,538,027 | Mozley | Jan. 16, 1951 |
| 2,638,811 | Williams | May 19, 1953 |
| 2,683,806 | Moody | July 13, 1954 |
| 2,706,811 | Steele | Apr. 19, 1955 |
| 2,712,065 | Elbourn et al. | June 28, 1955 |
| 2,739,236 | Holt | Mar. 20, 1956 |
| 2,835,801 | Haueter | May 20, 1958 |

OTHER REFERENCES

Proceeding of the IRE, vol. 40, issue 1, pages 29–33, Jan. 1952.

Wireless World, November 1953, vol. 59, No. 11, page 530.